United States Patent

[11] 3,550,614

| [72] | Inventors | Christer E. T. Englund<br>Glendora;<br>Ali Marandi, Azusa, Calif. |
|---|---|---|
| [21] | Appl. No. | 772,269 |
| [22] | Filed | Oct. 31, 1968 |
| [45] | Patented | Dec. 29, 1970 |
| [73] | Assignee | Clemar Manufacturing Corp.<br>Azusa, Calif.<br>a corporation, by mesne assignments to |

[54] CONTAMINANT BARRIER FOR SOLENOID VALVES
7 Claims, 7 Drawing Figs.

[52] U.S. Cl. ..................................... 137/245,
137/513.5, 251/129, 251/141
[51] Int. Cl. .......................................... F16k 31/06,
F16k 31/40
[50] Field of Search........................... 251/141,
129; 137/245; 251/55, 139; 137/513.5

[56] References Cited
UNITED STATES PATENTS

| 2,382,664 | 8/1945 | Ray .................. | 251/141X |
| 2,769,457 | 11/1955 | Wittenberg.......... | 137/513.5X |
| 3,245,651 | 4/1966 | Erickson ............ | 251/129 |

*Primary Examiner*—Arnold Rosenthal
*Attorney*—Lyon and Lyon

ABSTRACT: A barrier to minimize entrance of solid particles between a plunger member and a solenoid armature and a surrounding socket member in which the plunger slides; the barrier forming, when pressed against the mating surface, minute passages smaller than the clearance space between the plunger member and socket member which permit ingress of fluid as the plunger member moves outwardly relative to the socket member, the barrier moving away from its mating surface, on egress of fluid as the plunger member moves inwardly relative to the socket member to permit flushing of any particles which may have entered.

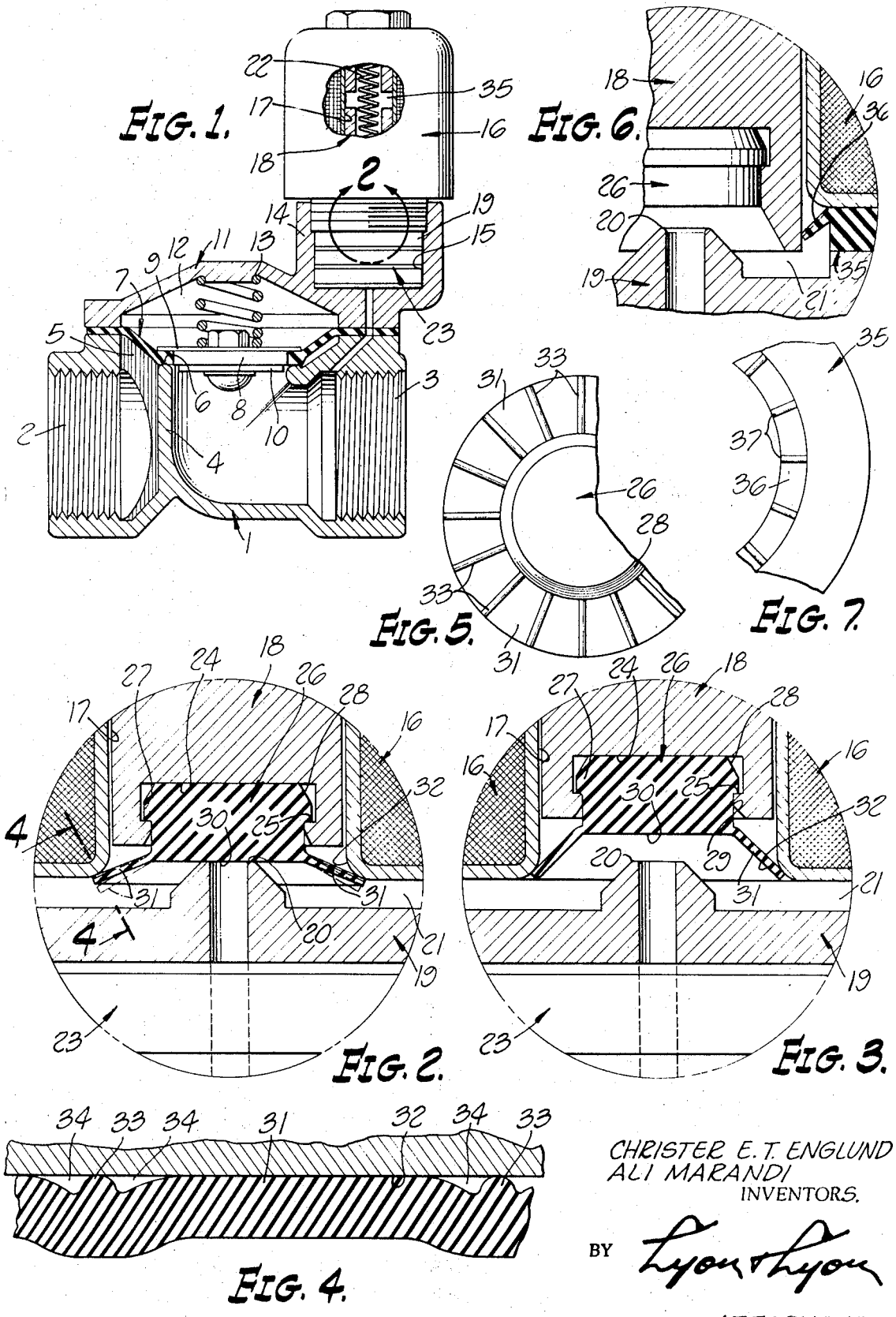

CONTAMINANT BARRIER FOR SOLENOID VALVES

BACKGROUND OF THE INVENTION

Solenoid valves which are employed to control fluids containing contaminants in the form of solid particles have required fluid be filtered to permit free movement of the armature. Such filters, however, eventually clog and restrict the free movement of the armature.

Another approach is to isolate the armature from the fluid being controlled by a diaphragm. However, this requires the armature chamber to be vented. If the venting air is free of contaminant, this is satisfactory, although expensive. Often the solenoid is so located that such external venting of the armature chamber cannot be accomplished. This is particularly true of solenoid valves which control water supply for irrigation systems, and which are buried underground. Typical of this type of valve is the valve disclosed in the copending application, Serial No. 635,065, filed May 1, 1967.

SUMMARY OF THE INVENTION

The present invention is particularly directed to a contaminant barrier for solenoid valves of the type disclosed in the hereinbefore identified copending application which are normally buried underground and intended to control the flow of water. Included in the objects of this invention are:

First, to provide a contaminant barrier in the form of a flexible skirt which contacts but does not sealingly engage the entrance to the armature chamber, so that fluid access is provided with the chamber, but particles sufficient to bind the armature are excluded; the skirt being adapted to move clear when the armature retracts into the chamber to permit the flushing out of such particles which may have entered.

Second, to provide a contaminant barrier which may be incorporated as an integral part with a valve seat carried by the armature.

Third, to provide a device of this type which also functions to slow the closing movement of the valve, thereby minimizing transient pressure surges in the passages controlled by the valve.

DESCRIPTION OF THE FIGURES

FIG. 1 is a sectional view through a pilot operated valve, shown in its closed position.

FIG. 2 is an enlarged fragmentary sectional view of the pilot valve, with the pilot valve in its closed position, the view being taken within circle 2 of FIG. 1.

FIG. 3 is an enlarged fragmentary sectional view corresponding to FIG. 2, showing the pilot valve in its open position.

FIG. 4 is a further enlarged fragmentary sectional view, indicating the minute passages formed when the surface of the barrier skirt is pressed against the entrance end of the armature socket.

FIG. 5 is a fragmentary plan view of the pilot valve element and barrier skirt.

FIG. 6 is an enlarged fragmentary sectional view, similar to FIG. 3, showing a modified form of the barrier.

FIG. 7 is a fragmentary plan view thereof.

A pilot operated valve, adaptable to the contamination barrier, includes a main valve body 1, having an inlet 2 and an outlet 3 which may be coaxially separated by a partition 4. The valve body is provided with a recess 5 at one lateral side, which communicates with both the inlet and the outlet. A valve seat 6, communicating with the outlet, confronts the lateral recess 5.

The recess 5 is covered by a diaphragm 7, the central portion of which forms a valve element 8, engageable with the valve seat 6, and having stiffening washers 9 and 10 on opposite sides.

The diaphragm 7 is covered by a diaphragm bonnet 11, which forms with the diaphragm a bonnet chamber 12. A spring 13, in the bonnet chamber 12, urges the valve element 8 against the valve seat 6.

At on side of the diaphragm bonnet 11, there is formed a pilot valve mounting boss 14, having a cylindrical recess 15 therein, screw-threaded at its upper end to receive a solenoid unit 16, having an armature chamber or socket 17 therein, which receives an armature 18.

Mounted within the recess 15 is a valve seat disc 19, having a central raised seat 20, confronting the armature 18. The disc 19 and the confronting end of the solenoid unit define a pilot valve chamber 21.

The solenoid unit 16 opens the pilot valve, whereas a spring 22 closes the plot valve.

Interposed between the valve seat disc 18 and the bottom of the recess 15, is a flow resistance unit 23, and suitable control passages connect the pilot valve chamber 21 with the bonnet chamber 12 and with a point upstream from the main valve seat 6, all as more fully disclosed in the hereinbefore referred to application.

The construction so far described may be considered as conventional. In the exercise of the present invention, the armature 18 is provided with an undercut recess 24, forming a shoulder 25. The recess receives a seat plug 26, having a small flange 27, a tapered end 28 and a groove 29, so that the valve seat plug 26 may be pressed into the recess 24 for retention by interengagement between the flange 27 and shoulder 25. The exposed surface of the plug forms a valve face 30, engageable with the raised seat 20.

The periphery of the plug 26 is provided with a relatively thin barrier skirt 31, the periphery of which engages the entrance to the armature chamber or socket 17, which forms an annular valve face 32, preferably curved in cross section. The barrier skirt may be normally flat or conical.

It will be noted from comparison of FIGS. 2 and 3, that the skirt 31 remains in contact with the valve face 32, whether the pilot valve is open or closed, but, during opening movement of the armature, the skirt is forced away from the valve face, as indicated by dotted lines in FIG. 2.

The surface of the skirt engaging the valve face is provided with minute ribs 33 so that under contact pressure minute passages 34 are formed along opposite sides of each rib. The dimensions of these passages so formed are significantly smaller than the radial clearance distance between the armature and the socket walls, as well as the dimensions of most of the particulate matter which may be entrained in the fluid.

Operation of the contaminant barrier is as follows:

When the valve face 32 engages the valve seat 20, the armature is relatively extended, defining, at its inner end, a cavity 35 with the walls of the socket 17. When the solenoid 16 is energized, the armature moves away from the valve seat 20, expelling fluid forcibly from the cavity 35 and the socket 17, past the skirt 31, and deflecting the skirt away from the valve face 32, as indicated by dotted lines in FIG. 2.

When the valve armature 18 moves toward the raised seat 20, fluid pressure forces the periphery of the skirt 31 against the valve face 32 so that flow into the socket 17 and into the cavity 35 is limited by the minute passages 34, which are smaller than the clearance space between the solenoid 16 and the walls of the socket 17.

Thus, such small particles as may enter are too small to do any harm and furthermore are forcibly ejected when the solenoid valve is opened.

It will also be noted that, when the armature 18 closes the pilot valve, it is under urge of the spring 22 and the effective area of the passages 34 is minimal; thus, the pilot valve closes sufficiently slowly, as to avoid or minimize pressure surge.

Reference is now directed to FIGS. 6 and 7, which illustrate a modified form of the barrier. In this case, a yieldable ring 35 is clamped between the solenoid unit 16 and the valve seat disc 19. Extending radially inwardly therefrom and engageable with the armature 18 is a skirt 36 corresponding to the skirt 31, and having minute ribs 37, corresponding to the ribs 32 and which, on contacting the side of the armature 19, form minute passages 38, corresponding to the passages 34. The barrier skirt 36 functions in the same manner as the barrier skirt 31. The plug 26, minus the skirt 31, is retained.

It should be noted that while a pilot valve for an irrigation valve is shown for purposes of illustration, the invention is not limited to pilot valves, or to solenoid valves, but has application to any valve having a socket and a plunger between which particulate matter may enter and interfere with operation.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:

1. A contaminant barrier for valves having a socket element open at one end and a plunger element mounted therein, said elements forming between their inner ends a surge chamber, and forming between their cylindrical side walls a clearance space to permit reciprocation of said plunger element, said elements being exposed to the fluid controlled by the valve and containing particulated contaminants, said barrier comprising:
   a. an imperforate flexible member secured to one of said elements, sloping therefrom across the clearance space in the direction of flow of fluid therefrom and yieldably contacting the wall of the other of said elements;
   b. means in the region of contact between said flexible member and the element contacted thereby restricting flow of said fluid into said surge chamber during movement of said plunger outwardly from said socket element thereby to minimize pressure surge in the fluid;
   c. the wall engaging portion of said flexible member defining the axially outer extremity of the clearance space and readily yieldable to outward flow of fluid from said surge chamber to permit rapid flow of fluid from the surge chamber between the cylindrical walls and axially past the flexible member thereby to permit complete washing of such contaminants from said surge chamber and clearance space as may have entered past said flexible member when in its flow restricting position.

2. A contaminant barrier, as defined in claim 1, wherein said flexible member includes a central plug received in the outer end of said plunger element and forming a valve seat, and a surrounding integral annular skirt sloping radially as well as axially outward and contacting the walls of said socket element at the open end thereof.

3. A contaminant barrier, as defined in claim 1, wherein said flexible member includes a ring fixed with respect to the open end of said socket element and a radially inwardly and axially outwardly directed conical annular skirt contacting the plunger element.

4. A solenoid valve for fluids containing particulate matter, comprising:
   a. means defining a valve chamber, having an inlet and an outlet;
   b. a cylindrical socket element forming a wall of said chamber;
   c. a cylindrical armature element movable out of and into said socket element and defining therewith a cylindrical clearance space thereby causing corresponding surge of fluid into and out of said socket element upon operation of said armature element to close and open communication between said inlet and outlet;
   d. an essentially conical imperforate flexible barrier fixed to one of said elements and sloping axially outward therefrom for yieldable contact with a wall of the cylindrical clearance space formed by the other element for radial movement to and from said wall, the contacting portion of said flexible barrier having means at its periphery forming with the contacted wall passages of lesser dimension than said clearance space, thereby to effect greater restriction to axial flow of fluid into said cylindrical space, the contacting portion of said flexible barrier constituting the extreme axial end of the cylindrical space and readily displaced by outward flow therefrom to permit rapid flow of fluid from the cylindrical space thereby to effect complete purging of contaminants therefrom;
   e. and means including a solenoid and a spring for effecting reciprocation of said armature element.

5. A solenoid, as defined in claim 4, wherein an integral valve seat plug is centrally located in said flexible barrier and is received in said armature element, and said flexible barrier is a skirt extending radially as well as axially outwardly therefrom.

6. A solenoid, as defined in claim 4, wherein said flexible barrier includes a ring fixed with respect to the open end of said socket element, and a radially inwardly directed annular skirt contacting the armature element.

7. The combination with a solenoid valve having a socket element having an open end, a solenoid surrounding the socket element, a raised valve port facing toward the socket element, and a plunger reciprocable in the socket element and having a recess confronting the valve port and enlarged at its inner end, of a single piece combination valve seat and contaminant barrier comprising:
   a. a central sealing plug having an enlarged end adapted to be forced into the recess for retention therein by the enlarged inner end thereof, the plug having an outer sealing surface engageable with the valve port;
   b. a peripheral contaminant barrier flange diverging axially outward from the plunger toward, and surrounding the valve port in spaced relation thereto, the periphery of the flange being engageable with the margins of the open end of the socket element;
   c. the periphery of said flange being readily displaced radially inward and axially outward from the socket element to permit free flow of fluid from the space between the socket element and armature element thereby to cause a flushing action during movement of the armature element into the socket element and away from the valve port;
   d. and means at the portion of said flange contacting the socket element forming therewith rudimentary passages to permit restricted flow into the space between the socket element and armature element thereby reducing the rate of movement of the sealing plug toward the valve port and limiting the particle size of contaminants entering the space between the socket element and armature element to permit free flushing of the contaminants therefrom during inward movement of the armature element.